United States Patent
Masputra

(10) Patent No.: US 8,873,527 B2
(45) Date of Patent: Oct. 28, 2014

(54) SYSTEM AND METHOD FOR MANAGING ROUTERS AND COMMUNICATION INTERFACES ON A COMPUTING DEVICE

(75) Inventor: Cahya A. Masputra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 13/007,446

(22) Filed: Jan. 14, 2011

(65) Prior Publication Data

US 2012/0182978 A1 Jul. 19, 2012

(51) Int. Cl.
*H04W 84/02* (2009.01)
*H04L 12/751* (2013.01)
*H04W 60/00* (2009.01)
*H04L 29/06* (2006.01)
*H04W 88/06* (2009.01)

(52) U.S. Cl.
CPC ........... *H04W 60/005* (2013.01); *H04L 45/026* (2013.01); *H04W 88/06* (2013.01); *H04L 69/161* (2013.01)
USPC .......................................... 370/338; 370/419

(58) Field of Classification Search
USPC ...................... 370/338, 395.3, 395.31, 395.52
See application file for complete search history.

(56) References Cited

U.S. PATENT DOCUMENTS

| | | | |
|---|---|---|---|
| 6,064,671 A | 5/2000 | Killian | |
| 6,754,220 B1 | 6/2004 | Lamberton et al. | |
| 7,567,522 B2 | 7/2009 | Borowski | |
| 7,706,304 B2 | 4/2010 | Sinicrope et al. | |
| 2007/0030855 A1* | 2/2007 | Ribiere et al. | 370/401 |
| 2007/0165543 A1* | 7/2007 | Joo | 370/254 |
| 2008/0317049 A1* | 12/2008 | Sinicrope et al. | 370/401 |
| 2009/0304000 A1 | 12/2009 | Masputra et al. | |
| 2009/0304001 A1 | 12/2009 | Masputra et al. | |
| 2009/0304005 A1 | 12/2009 | Masputra et al. | |
| 2009/0304006 A1* | 12/2009 | Masputra et al. | 370/395.32 |
| 2010/0223363 A1 | 9/2010 | Sarikaya et al. | |
| 2011/0182295 A1* | 7/2011 | Singh et al. | 370/401 |
| 2011/0228734 A1* | 9/2011 | Laganier et al. | 370/329 |
| 2012/0057511 A1* | 3/2012 | Sivakumar et al. | 370/310 |

OTHER PUBLICATIONS

Draves et al., RFC 4191, "Default Router Preferences and More-Specific Routers", Nov. 2005, Network Working, Group, pp. 16.*
Deering, RFC 1256, "ICMP Router Discovery Messages", Sep. 1991, Network Working Group, pp. 20.*

(Continued)

*Primary Examiner* — Andrew Chriss
*Assistant Examiner* — Peter Mak
(74) *Attorney, Agent, or Firm* — Park, Vaughan, Fleming & Dowler LLP

(57) ABSTRACT

An apparatus and method are described for managing router and communication interfaces. For example, one embodiment of a method implemented on a computing device having a plurality of communication interfaces comprises: receiving a plurality of router advertisement packets indicating a preference level of each of a plurality of routers, each of the plurality of routers reachable through one of the communication interfaces on the computing device; designating one of the communication interfaces as a primary interface and the remainder of the communication interfaces as scoped interfaces; specifying a primary router for the primary interface based on a preference level associated with the primary router, the primary router selected from a group of all of the routers reachable through the primary interface; and specifying a default router for each of the scoped interfaces based on a preference level of each default router, each default router selected from a group of all of the routers reachable through its scoped interface.

30 Claims, 9 Drawing Sheets

IPV4 Routing Table 207

| Destination 301 | Routing Data 302 | Flags 303 | I/F 304 |
|---|---|---|---|
| default | Default Routing Data A | Unscoped (Primary) | en1 |
| default | Default Routing Data B | Scoped | en0 |
| default | Default Routing Data C | Scoped | en2 |
| default | Default Routing Data D | Scoped | en3 |
| 10.0.1.26 | Host Routing Data A | | en1 |
| 10.0.1.5 | Host Routing Data B | | en1 |
| 10.0.1.26 | Host Routing Data C | | en0 |
| 10.0.1.5 | Host Routing Data D | | en0 |
| 167.78.89.12 | Host Routing Data E | | en0 |
| 167.78.89.132 | Host Routing Data F | | en0 |

(56) References Cited

OTHER PUBLICATIONS

PCT International Search Report and Written Opinion for PCT/US2012/021047, mailed on Apr. 10, 2012, (11 pgs.).

Bagnulo, "Updating RFC 3484 for multihoming support; draft-bagnulo-rfc3484-update-00,txt", Jun. 14, 2006, XP015045787, (12 pgs.).

Deering, et al., "ICMP Router Discovery Messages: rfc1256.txt", Sep. 1, 1991, XP015007044, (19 pgs.).

Draves, et al., "Default Router Preferences and More-Specific Routes: rfc4191.txt"; Nov. 1, 2005, XP015054878, (15 pgs.).

Kaouthar, et al., "Dynamic router selection; draft-sethom-dynamic-router-selection-01.txt", Jan. 1, 2006, XP 015044573, (10 pgs.).

Narten, et al., "Neighbor Discovery for IP Version 6 (IPv6); rfc2461.txt", Dec. 1, 1998. XP015008245, (94 pgs.).

Park, et al., "Interface selection for a multihomed mobile router; draft-park-mis-02.txt", Jul. 7, 2007, XP015052073, (14 pgs.).

\* cited by examiner

IPV4 Routing Table 207

| Destination 301 | Routing Data 302 | Flags 303 | I/F 304 |
|---|---|---|---|
| default | Default Routing Data A | Unscoped (Primary) | en1 |
| default | Default Routing Data B | Scoped | en0 |
| default | Default Routing Data C | Scoped | en2 |
| default | Default Routing Data D | Scoped | en3 |
| 10.0.1.26 | Host Routing Data A | | en1 |
| 10.0.1.5 | Host Routing Data B | | en1 |
| 10.0.1.26 | Host Routing Data C | | en0 |
| 10.0.1.5 | Host Routing Data D | | en0 |
| 167.78.89.12 | Host Routing Data E | | en0 |
| 167.78.89.132 | Host Routing Data F | | en0 |

*Fig. 3*

IPV6 Routing Table 204

| Destination 401 | Routing Data 402 | Flags 403 | I/F 404 |
|---|---|---|---|
| default | Primary Router 221 | Unscoped (Primary) | en1 |
| default | Router 220 | Scoped | en0 |
| default | Router 122 | Scoped | en2 |
| default | Router 123 | Scoped | en3 |
| 2001:200:dff:fff1:216:3eff:feb1:44d7 | Host Routing Data A1 | | en1 |
| 2001:4f8:fff6::22 | Host Routing Data B1 | | en1 |
| 2001:1890:1112:1::20 | Host Routing Data C1 | | en0 |
| 2001:1af8:1:f006::6 | Host Routing Data D1 | | en0 |
| 2001:838:2:1::30:67 | Host Routing Data E1 | | en0 |
| 2001:423:2:2::31:77 | Host Routing Data F1 | | en0 |

*Fig. 4*

SYSTEM AND METHOD FOR MANAGING ROUTERS AND COMMUNICATION INTERFACES ON A COMPUTING DEVICE

BACKGROUND

1. Field of the Invention

This invention relates generally to the field of data networks. More particularly, the invention relates to an improved system and method for managing routers and communication interfaces on a computing device.

2. Description of the Related Art

FIG. 1 illustrates a prior art computing device 101 communicatively coupled to a plurality of routers 120-123 through a variety of different communication interfaces en_0 110, en_1 111, en_2 112, en_1 113. Examples of such communication interfaces include IEEE 802.3-based interfaces (i.e., Ethernet), IEEE 802.11-based interfaces (e.g., "WiFi"), Bluetooth interfaces, and wireless cellular data network interfaces (e.g., such as CPRS, 3G, and/or 4G interfaces).

As illustrated, the routers 120-123 may connect the computing device 101 to local hosts 140-142 on private local area networks (LANs) 130-133. In addition, the routers 120-123 may route packets between the computing device 101 and remote hosts 143-144 through gateway devices 150-151 coupled wide area networks 610 such as the public Internet. Communication over the various networks requires the computing device 101 and routers 120-123 to implement a common network protocol such as the TCP/IP protocol. Consequently, as illustrated in FIG. 1, the computing device includes a networking engine 102 for implementing a network protocol stack 103. To communicate over the network, an application 105 typically makes calls to the networking engine 102 and, in response, the networking stack 102 selects an appropriate interface and router through which to establish network connections.

There are currently two different forms of the TCP/IP networking protocol, referred to as Internet Protocol Version 4 (IPV4) and Internet Protocol Version 6 (IPV6). IPV6 is a version of the Internet Protocol (IP) suite that is designed to succeed Internet Protocol version 4 (IPV4), which is currently in widespread use across the Internet. IPV6 is largely incompatible with IPV4, utilizing a different addressing space and connection protocol. One difference between IPV6 and IPV4 which is particularly relevant to the present application is that routers on an IPV6 network designate a "router preference" which must be obeyed by the IPV6 networking stack 103. Specifically, each IPV6 router transmits a "router advertisement" packet to the IPV6 networking stack 103 which contains network-layer configuration parameters including a router preference level of "high," "medium" or "low." To be compatible with the IPV6 protocol, the IPV6 networking stack 103 must make a default IPV6 router selection 104 based on the preference levels specified by each of the routers 120-123. Thus, if one particular router 121 species a "high" preference level while all of the other routers 120, 122-123 specify "medium" or "low" preference levels, the default router selection 104 must be set to router 121.

One problem with this configuration is that, in many cases, the user of the computing device may want to communicate over an interface which is not associated with the selected default router 121. For example, if the user has access to both a Wifi network through interface 112 and a cellular network through interface 111, the user may want to connect over the WiFi network given the cost and speed of the cellular network. However, if the default router 121 is associated with the cellular interface 111, then the networking engine 102 will automatically connect using the cellular interface 111. In addition, certain applications require access to particular private networks. For example, host 142 on private network 131 may represent a data service such as visual voicemail offered by the user's cellular service provider. Consequently, all applications which rely on this data service must have access to private network 131, which may not be the case in current implementations. As such, what is needed is a more flexible and intelligent manner to select interfaces and routers on an IPV6 network.

SUMMARY

An apparatus and method are described for managing router and communication interfaces. For example, one embodiment of a method implemented on a computing device having a plurality of communication interfaces comprises: receiving a plurality of router advertisement packets indicating a preference level of each of a plurality of routers, each of the plurality of routers reachable through one of the communication interfaces on the computing device; designating one of the communication interfaces as a primary interface and the remainder of the communication interfaces as scoped interfaces; specifying a primary router for the primary interface based on a preference level associated with the primary router, the primary router selected from a group of all of the routers reachable through the primary interface; and specifying a default router for each of the scoped interfaces based on a preference level of each default router, each default router selected from a group of all of the routers reachable through its scoped interface.

BRIEF DESCRIPTION OF THE DRAWINGS

A better understanding of the present invention can be obtained from the following detailed description in conjunction with the following drawings, in which:

FIG. 3 illustrates one embodiment of an internet protocol (IP) version 4 (IPV4) routing table.

FIG. 4 illustrates one embodiment of an internet protocol (IP) version 6 (IPV6) routing table.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention associates a desired primary router with a primary/non-scoped communication interface, notwithstanding the IPV6 preference levels specified by the IPV6 protocol. As described in detail below, in one embodiment, a linked list of router IDs (e.g., comprising router IP addresses) and associated preference levels is maintained by an IPV6 networking engine. When a primary/non-scoped interface is specified (e.g., by networking program code such as a networking application), the desired primary/non-scoped default router is set to the reachable router on that interface link with the highest router preference. Other routers having the highest preference levels for their respective default interfaces are also selected. When there is more than one router on a particular interface link, the one with the highest router preference will be installed, either as scoped or primary/non-scoped route entry, depending on whether the interface is scoped or primary/non-scoped. If all of the routers share the same preference value, the one installed will be the static (if one exists) or the first encountered reachable router (i.e. static is prioritized above dynamic for routers with the same preference level on the same communication link). If the Default Router List is empty, it is assumed that all destinations are on the active communication link.

Figure 1:
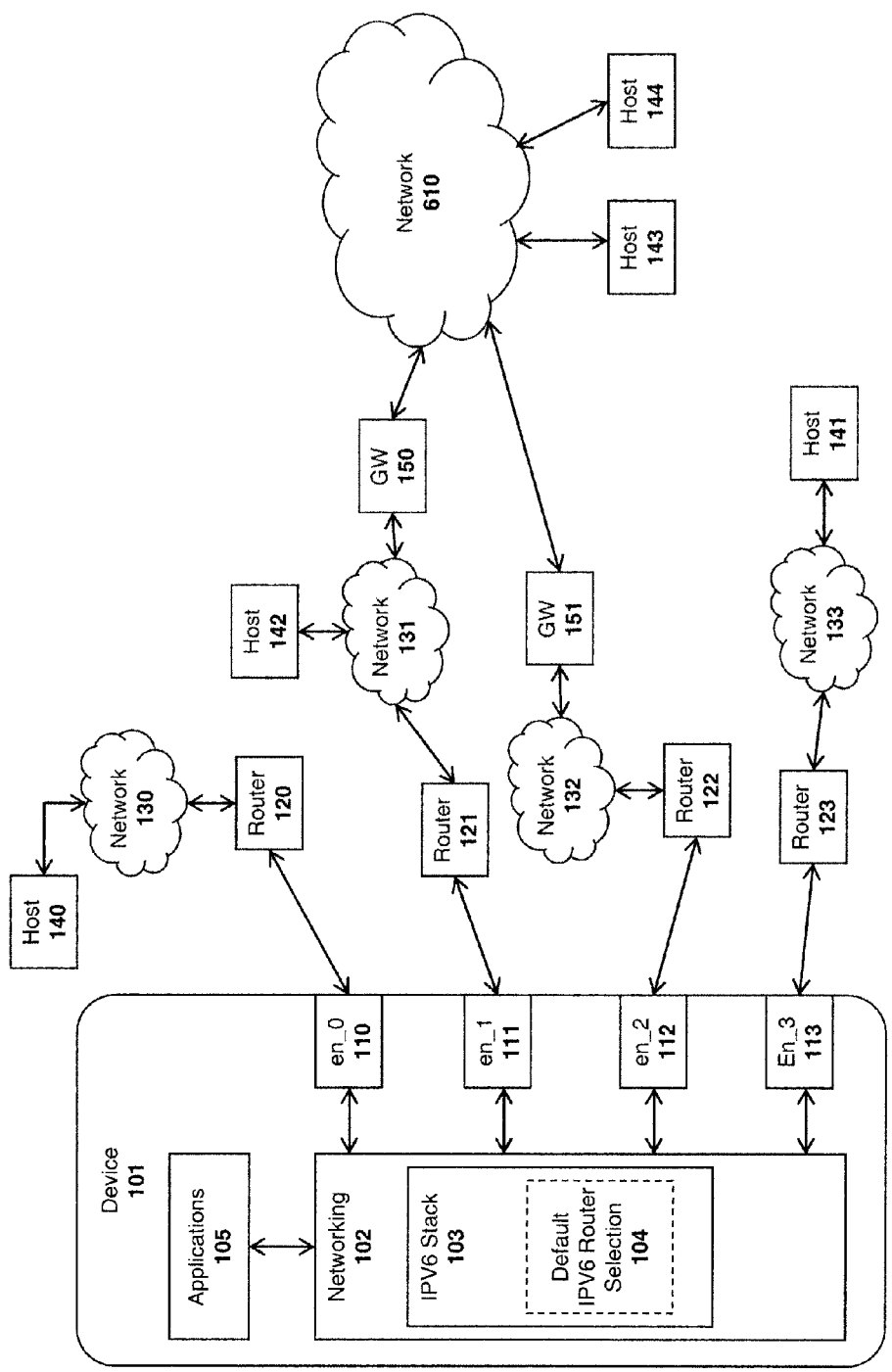
FIG. 1 illustrates a prior art networking architecture for communicating with hosts over a local area network (LAN) and/or a wide area network (WAN) such as the Internet.
Figure 2:
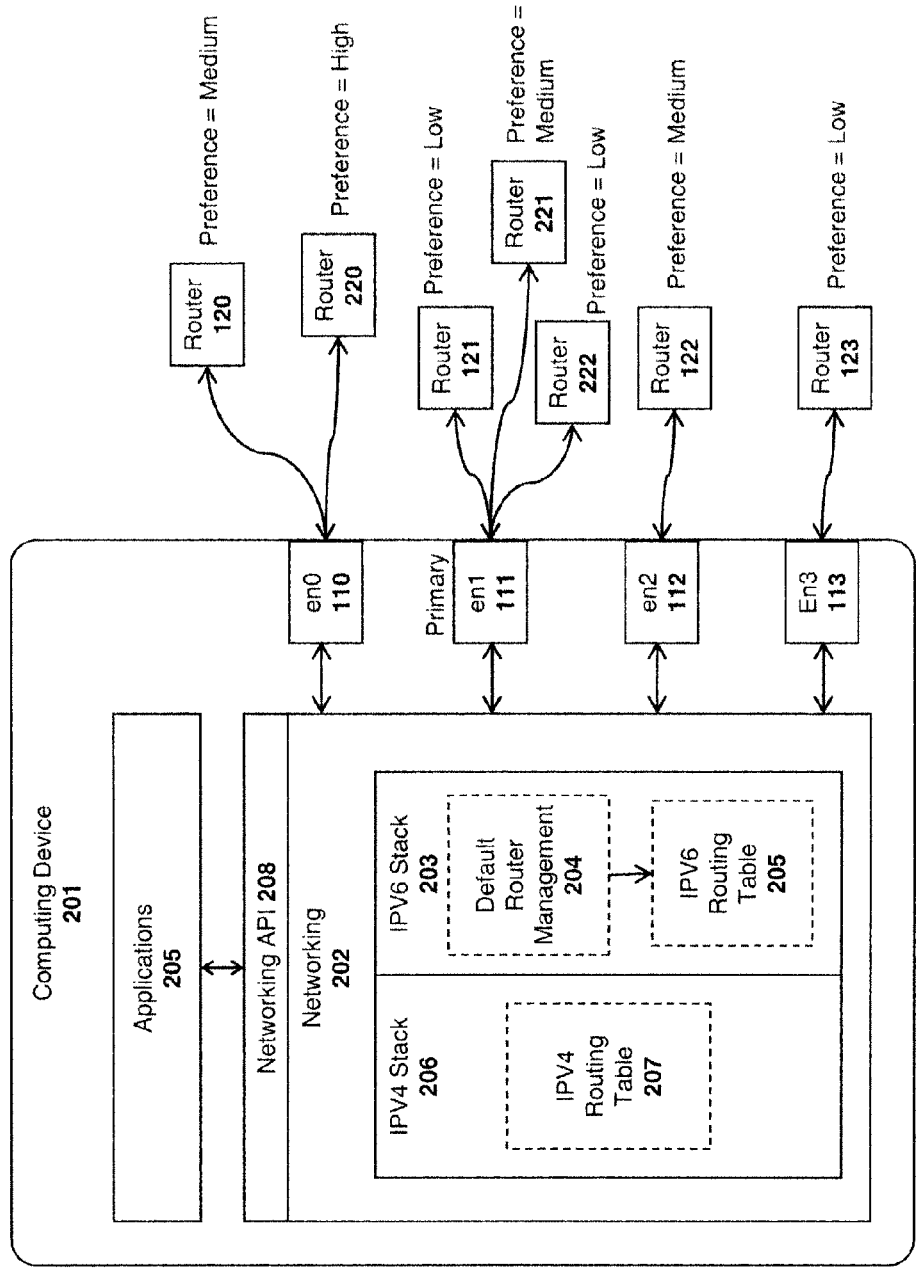
FIG. 2 illustrates one embodiment of a computing device architecture for intelligently selecting routers and communication interfaces.

As illustrated in FIG. 2, a computing device 201 in accordance with one embodiment of the invention comprises a networking engine 202 which may include both an IPV4 networking stack 206 and an IPV6 networking stack 203. The networking engine 202 may be accessible by applications 205 through a networking application programming interface (API) 208. For example, in one embodiment, an application 205 establishes network connections by making an appropriate set of calls to the API 208. In response, the networking engine 202 performs the operations necessary for opening a TCP socket connection with a remote host via one of the interfaces 110-113. In one embodiment, the networking API 208 and networking engine 202 form a portion of the operating system executed on the computing device 201 (e.g., such as a version of the Mac OSX™ operating system). Exemplary API architectures are described below with respect to FIGS. 7-9. It should be noted, however, that the underlying principles of the invention are not limited to any particular API architecture.

In one embodiment, the IPV4 networking stack 206 maintains an IPV4 routing table 207 for quickly determining an appropriate route to access a host at a particular IPV4 address. In one embodiment, the IPV4 networking stack 206 manages the routing table 207 as described in the following co-pending patent applications, which are assigned to the assignee of the present application and which are incorporated herein by reference:

U.S. Patent Application No. 2009/0304006, filed Sep. 30, 2008, entitled ROUTING TABLE BUILD ALGORITHM FOR A ROUTING TABLE THAT USES A SEARCH KEY CONSTRUCTED FROM PACKET DESTINATION ADDRESS AND OUTBOUND INTERFACE;

U.S. Patent Application No. 20090304005, filed Sep. 30, 2008, entitled ROUTING TABLE LOOKUP ALGORITHM EMPLOYING SEARCH KEY HAVING DESTINATION ADDRESS AND INTERFACE COMPONENT;

U.S. Patent Application No. 20090304001, filed Sep. 30, 2008, entitled SOURCE ADDRESS BASED ROUTING PROCESS;

U.S. Patent Application No. 20090304000, filed Sep. 30, 2008, entitled OUTBOUND TRANSMISSION OF PACKET BASED ON ROUTING SEARCH KEY CONSTRUCTED FROM PACKET DESTINATION ADDRESS AND OUTBOUND INTERFACE.

While the focus of the present application is the IPV6 networking stack 203, an exemplary IPV4 routing table 207 is shown in FIG. 3 to illustrate some of the techniques described in the above co-pending applications, which may be used in combination with the IPV6 techniques described herein. Specifically, unlike prior routing systems, the routing table described in the co-pending applications allows multiple default interface entries, some of which are "scoped" to particular routing destinations and one of which is "unscoped" (also referred to as the "primary" interface). For example, in FIG. 3, interfaces en0, en2 and en3 are "scoped" and interface en1 is "unscoped." In operation, the lookup key used to access the routing table for scoped entries is performed using both the destination IP address and the interface index. Consequently, using scoped routing, each entry in the routing table may be instantiated on a per-interface basis. For example, in FIG. 3, routing entries 10.0.1.26 and 10.0.1.5 are scoped to both the en1 and en0 interfaces. Thus, a lookup in the table using 10.0.1.26 and 10.0.1.5 with the interface index for en1 will identify host routing data A and B, respectively; a lookup in the table using 10.0.1.26 and 10.0.1.5 with the interface index for en0 will identify host routing data C and D, respectively. The unscoped interface en1 will be used when a particular interface index is not specified (i.e., only a host address is specified). These and other features of the IPV4 stack and the IPV4 routing table 207 are described in detail in the co-pending applications.

Embodiments of the IPV6 stack will now be described. As an initial matter, however, it should be noted that the underlying principles of the invention do not require any implementation of the IPV4 stack. Thus, while the IPV4 stack 206 is described above because it may be implemented on the computing device 101 concurrently with the IPV6 stack 203, the IPV4 implementation is not required for complying with the underlying principles of the invention. In addition, the IPV4 stack may, in some cases, utilize a different default interface than the IPV6 stack.

Returning to FIG. 2, in one embodiment, the IPV6 stack includes a default router management module 204 for managing the routing entries within an IPV6 routing table 205 using the techniques described herein. Specifically, in one embodiment, the default router management module 204 identifies the primary interface within the IPV6 routing table 205 and associates the primary interface with a default router, which is the router reachable through that interface with the highest preference level. In one embodiment, if a first router with a relatively high preference level is not reachable but a second router with a relatively lower preference level is reachable, then the router with the relatively lower preference level will be selected as the default (i.e., the highest reachable router is selected). If none of the routers are currently reachable, the one with the highest preference is installed anyway and used as the default router for that interface.

In the particular example illustrated in FIG. 2, routers 120 and 220 associated with scoped interface en0 110 have preference levels of "medium" and "high," respectively (e.g., as determined by a router advertisement packet transmitted by each router 120, 220 over interface en0). Routers 121 and 222 associated with primary interface en1 have a preference level of "low" and router 221 has a preference of "medium." Router 122 associated with scoped interface en2 112 has a preference level of "medium" and router 123 associated with scoped interface en3 113 has a preference level of "low." Thus, in this example, once the primary interface of en1 111 is identified, router 221 is selected as the default router because it is has the highest preference level of all routers associated with primary interface en1 (i.e., routers 121, 221, and 222).

Consequently, as illustrated in FIG. 4, in the IPV6 routing table 204, flags 403 may be set to identify en1 as the primary (unscoped) interface and to identify en0, en2 and en3 as scoped interfaces. Routing data 402 identifies router 221 as the default router for the primary interface en1; router 220 as the default router for scoped interface en0 (i.e., because it has a higher preference level than router 120); router 122 as the default router for interface en2; and router 123 as the default router for interface en3.

Figure 5:
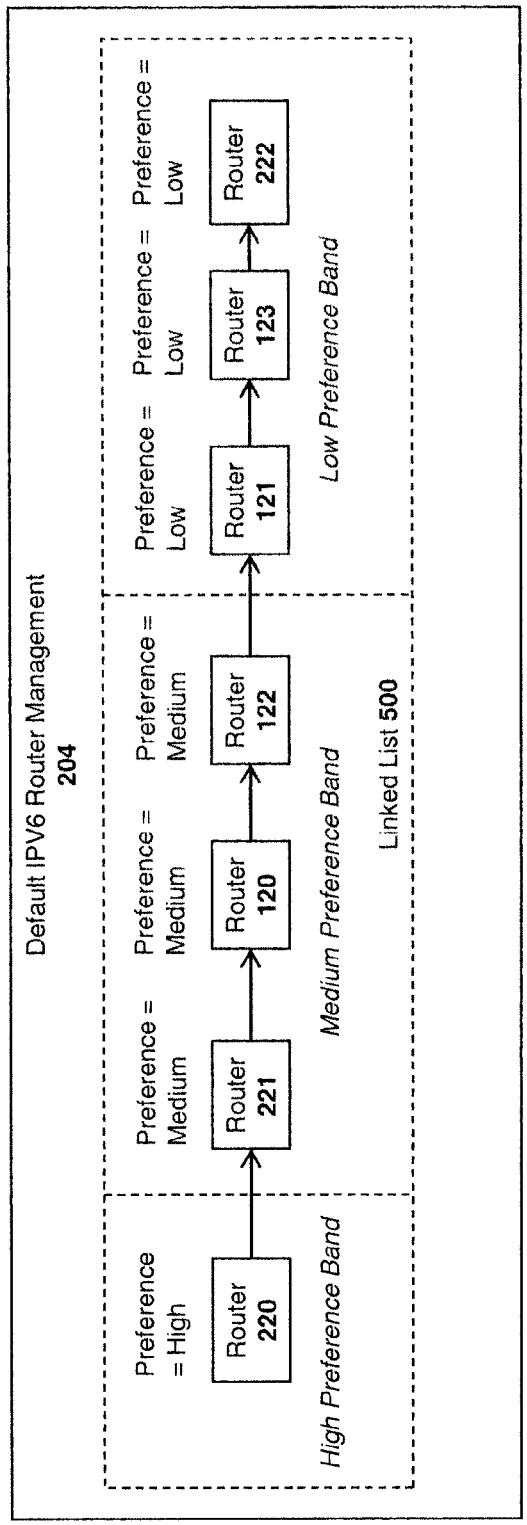
FIG. 5 illustrates one embodiment of a linked list which may be used for selecting routers.

As illustrated in FIG. 5, in one embodiment, the default router management module 204 arranges all routers from which it receives RA packets into a linked list 500 in order from high to low based on preference level. In one embodiment, each router is identified in the list by its IP address and preference value. Thus, router 220 is at the top of the list because it has a preference value of "high;" routers 120, 122 and 221 are next on the list because they have preference values of "medium"; and routers 121, 123, and 222 are last on the list with preference values of "low." In operation, to identify the default router to be associated with the primary interface, the default router management module 204 searches through the list starting at the top until it identifies the highest preference router associated with the primary interface. It also searches through the list starting at the top to identify the default routers for each scoped interface. It then updates the IPV6 routing table 205 accordingly.

In one embodiment, if two or more routers with the same preference level are all associated with the same interface, then the default router management module 204 may choose the one which is statically configured (if one exists) and/or the first encountered reachable router. Dynamic configuration involves processing RA packets from the routers as described herein. However, the interface may also be statically configured such that its address, prefix and default router entries are derived from a static configuration. For example, on a Mac OSX™ platform, this may happens when a user chooses a "Manual" method of configuration and enters the addresses themselves.

Figure 6:
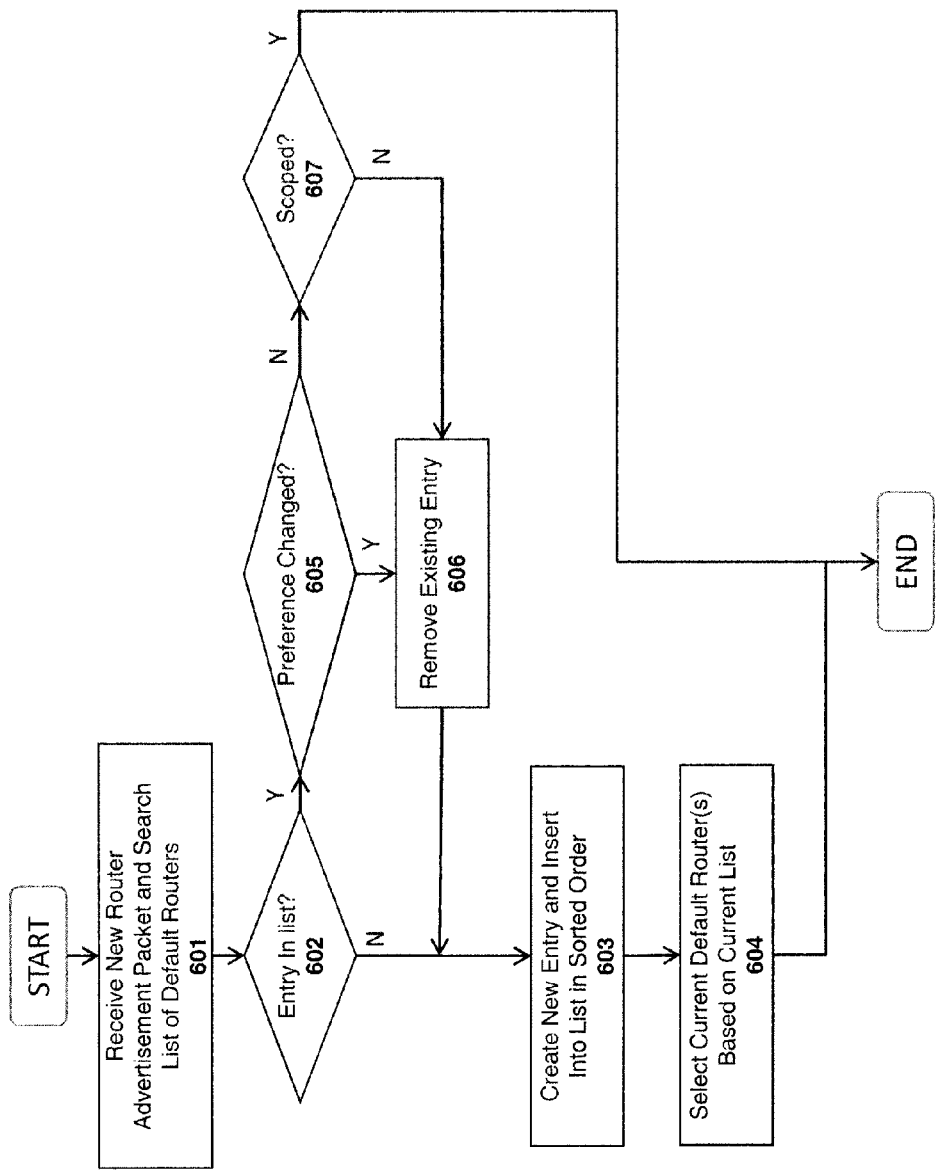
FIG. 6 illustrates one embodiment of a method for updating a prioritized router list and selecting a default router.

One embodiment of a method for updating the linked list and potentially identifying a new default router for an interface is illustrated in FIG. 6. At 601, a new router advertisement packet is received and, in response, the default router management module 204 searches the linked list 500. If an entry does not exist in the list, determined at 602, then at 603, a new entry is created and inserted into the list in sorted order. For example, if the preference level of the new router is "medium" then it will be inserted in the medium preference band (e.g., adjacent to router 221 in FIG. 5). At 604, the current default router(s) are selected for their respective interfaces based on the current list. In one embodiment, if the new router does not have a higher preference level than any existing routers associated with the same interface as the new router, then no changes are made to the routing table. If, however, the new router has a higher preference level than the other routers associated with the interface, then the new router will be assigned as the default router for that interface (which may be the primary interface or one of the scoped interfaces).

If an entry for the router already exists in the list then, at 605, a determination is made as to whether the preference level for the router has changed. If so, then the existing entry is removed at 606 and the process returns to 603 (i.e., where the router is reinserted using the new preference level). If the preference is the same and the router is scoped (i.e., associated with a scoped interface), determined at 607, then the process ends. If the preference is the same and the router is unscoped (i.e., associated with the primary interface), then at 606, the entry is removed and the process returns to 603 (wherein the router is reinserted).

Using the techniques described above, an application 205 may issue a "bind" command to bind a socket to any scoped or unscoped interface (e.g., via the networking API 208). Thus, in contrast to prior IPV6 implementations in which the application must follow the routing table which is under the complete control of the IPV6 router preference levels, the embodiments of the invention allow certain applications to designate certain interfaces and routers. This is beneficial, for example, if an application requires access to a particular private network which is only accessible via a specific set of routers. For example, in FIG. 2, if en2 112 is a wireless cellular interface and application 205 is a visual voicemail application which requires access to a particular visual voicemail service which is only accessible via the cellular router 122, then the application 205 may bind the TCP socket to this particular interface. A routing table entry will be entered ensure scoped routing with respect to this interface/socket combination. The outgoing IPV6 packets will then be transmitted out of the "correct" interface. In addition, using the present techniques, a particular router may be associated with a primary interface which will take priority over other interfaces and routers when a particular interface is not specified in the routing table. These and other benefits of the embodiments of the invention described herein will be readily apparent to those of ordinary skill in the art.

In one embodiment, a single integrated routing table may be used in place of the separate routing tables 205, 207 shown in FIG. 2. In this embodiment, the routing table may be accessed and managed by both the IPV6 stack 203 and the IPV4 stack 206. Each routing table described herein may be implemented in the form of a radix tree (e.g., the PATRICIA trie used in BSD Unix) which requires a unique key for accessing a particular entry. Thus, as described in the co-pending applications above, the "key" used for accessing the routing tables may be formed using a combination of both the interface ID and the host or subnet IP address. Once again, however, the underlying principles of the invention are not limited to these specific implementations.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above are implemented with program code (e.g., software), the underlying principles of the invention may be implemented using any combination of hardware, software and/or firmware. Accordingly, the scope and spirit of the invention should be judged in terms of the claims below.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
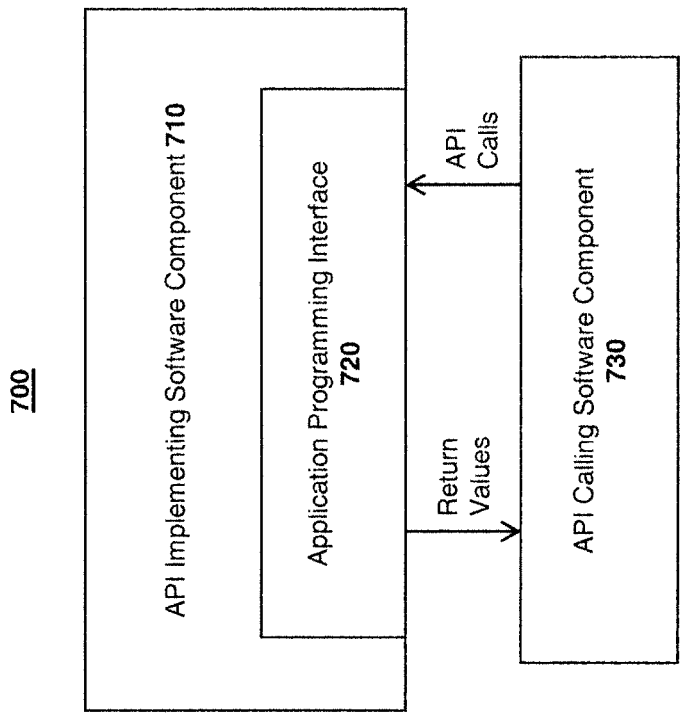
FIG. 7 illustrates a block diagram of an exemplary API architecture useable in some embodiments of the present invention.

FIG. 7 is a block diagram illustrating an exemplary API architecture, which may be used in some embodiments of the invention. As shown in FIG. 4, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 4 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a tangible machine-readable storage medium, which includes any mechanism for storing information in a form readable by a machine (e.g., a computer or other data processing system). For example, a tangible machine-readable storage medium includes magnetic disks, optical disks, random access memory (e.g. DRAM); read only memory, flash memory devices, etc.

Figure 8:
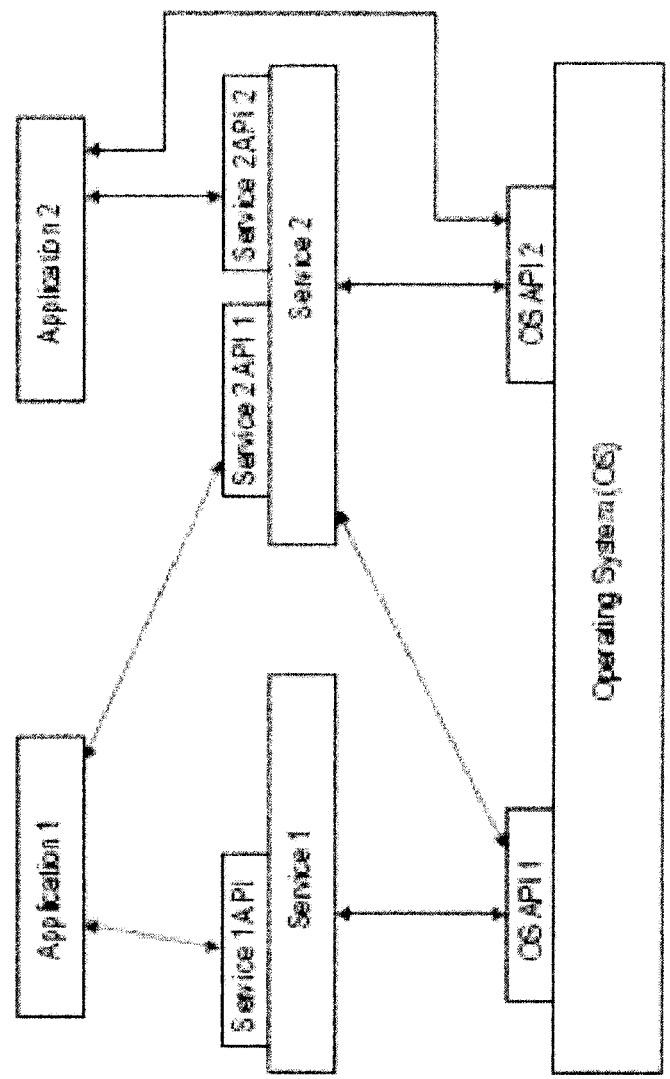
FIG. 8 shows an exemplary embodiment of a software stack useable in some embodiments of the present invention.

In FIG. 8 ("Software Stack"), an exemplary embodiment, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 9:
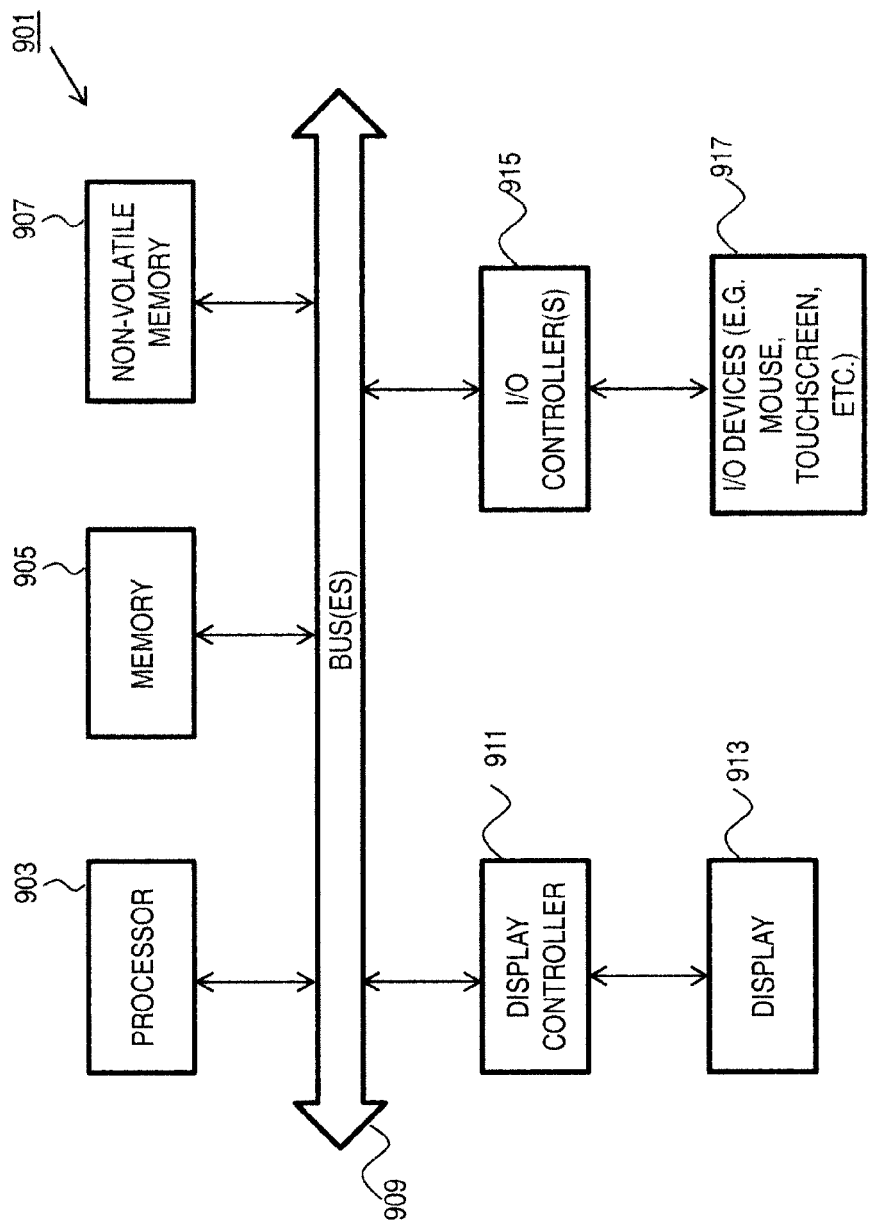
FIG. 9 shows, in block diagram form, an example of a data processing system which can be used with one or more embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 8 shows one example of a typical data processing system which may be used with the present invention. Note that while FIG. 8 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 8 may also be used with the present invention. The data processing system of FIG. 8 may be a Macintosh computer from Apple Inc. of Cupertino, Calif. (e.g., a Mac or a Macbook Pro). As shown in FIG. 9, the data processing system 901 includes one or more buses 909 which serve to interconnect the various components of the system. One or more processors 903 are coupled to the one or more buses 909 as is known in the art. Memory 905 may be DRAM or non-volatile RAM or may be flash memory or other types of memory. This memory is coupled to the one or more buses 909 using techniques known in the art. The data processing system 901 can also include non-volatile memory 907 which may be a hard disk drive or a flash memory or a magnetic optical drive or magnetic memory or an optical drive or other types of memory systems which maintain data even after power is removed from the system. The non-volatile memory 907 and the memory 905 are both coupled to the one or more buses 909 using known interfaces and connection techniques. A display controller 911 is coupled to the one or more buses 909 in order to receive display data to be displayed on a display device 913 which can display any one of the user interface features or embodiments described herein. The display device 913 can include an integrated touch input to provide a touch screen. The data processing system 901 can also include one or more input/output (I/O) controllers 915 which provide interfaces for one or more I/O devices, such as one or more mice, touch screens, touch pads, joysticks, and other input devices including those known in the art and output devices (e.g. speakers). The input/output devices 917 are coupled through one or more I/O controllers 915 as is known in the art. While FIG. 6 shows that the non-volatile memory 907 and the memory 905 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers. It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 905 or the non-volatile memory 907 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented on a computing device having a plurality of communication interfaces comprising:
   receiving a plurality of router advertisement packets indicating a preference level of each of a plurality of routers, each of the plurality of routers reachable through one of the communication interfaces on the computing device;
   designating one of the communication interfaces as a primary interface and the remainder of the communication interfaces as scoped interfaces, wherein each scoped interface is used for routing communications that comprise a reference to the scoped interface, and the primary interface is an unscoped interface that is used for routing communications that do not comprise a reference to an interface;
   specifying a primary router for the primary interface based on a preference level associated with the primary router, the primary router selected from a group of routers reachable through the primary interface; and
   specifying a default router for each of the scoped interfaces based on a preference level of each default router, each default router selected from a group of routers reachable through the corresponding scoped interface;
   wherein the primary router specified for the primary interface has a preference level which is relatively lower than a preference level for at least one of the routers associated with the scoped interfaces.

2. The method as in claim 1 wherein the preference levels are internet protocol version 6 (IPV6) preference levels.

3. The method as in claim 1 further comprising:
   associating one or more host addresses with a first scoped interface in a routing table, the method further comprising using the first scoped interface to open a communication channel with a first host identified by one of the one or more host addresses in response to a request to communicate with the first host.

4. The method as in claim 1 wherein the communication interfaces include a WiFi interface, an Ethernet interface, and a cellular data interface.

5. The method as in claim 1 wherein specifying a primary router and specifying a default router further comprises:
   arranging router identifiers for all of the routers for which a preference level has been received in a list, the router identifiers arranged in order of preference level;
   reading through the list to identify a router having the highest preference level and reachable through the primary interface to be the primary router; and
   reading through the list of identify a router having the highest preference level and reachable through each of the scoped interfaces to be the default router for each respective scoped interface.

6. The method as in claim 5 wherein the preference levels comprise "high," "medium," and "low."

7. The method as in claim 5 further comprising:
   receiving a new router advertisement (RA) packet transmitted from a first router on either the primary interface or one of the scoped interfaces, the RA packet having an indication of a preference level associated with the first router;
   determining if an entry for the first router already exists in the list and, if not, then entering an identifier for the first router in the list at a position based on a preference level associated with the first router; and
   reading through the list to identify a router having the highest preference level and reachable through the primary interface to be the primary router; and
   reading through the list of identify a router having the highest preference level and reachable through each of the scoped interfaces to be the default router for each respective scoped interface.

8. The method as in claim 7 wherein if an entry for the first router already exists in the list, then performing the operations of:
   determining if a preference level associated with the first router has changed and, if so, then removing the existing entry from the list and entering an identifier for the first router in the list at a position based on the new preference level associated with the first router.

9. The method as in claim 8 wherein if the preference level associated with the first router has not changed, then performing the operations of:
   determining if the first router is associated with a scoped interface or the primary interface and, if associated with the primary interface then removing the existing entry from the list and entering an identifier for the first router in the list at a position based on the new preference level associated with the first router.

10. The method of claim 5 wherein the list comprises a linked list.

11. A non-transitory machine-readable medium having program code stored thereon which, when executed by a machine, causes the machine to perform the operations of:
   receiving a plurality of router advertisement packets indicating a preference level of each of a plurality of routers, each of the plurality of routers reachable through one of the communication interfaces on the computing device;
   arranging router identifiers for all of the routers for which a preference level has been received in a list, the list comprising a linked list data structure having an entry for each router with a preference level, wherein the entries are linked in the preference level order;
   designating one of the communication interfaces as a primary interface and the remainder of the communication interfaces as scoped interfaces, wherein each scoped interface is used for routing communications that comprise a reference to the scoped interface, and the primary interface is an unscoped interface that is used for routing communications that do not comprise a reference to an interface;
   specifying a primary router for the primary interface based on a preference level associated with the primary router, the primary router selected from a group of routers reachable through the primary interface; and
   specifying a default router for each of the scoped interfaces based on a preference level of each default router, each default router selected from a group of routers reachable through the corresponding scoped interface;
   wherein the primary router selected for the primary interface has a preference level which is relatively lower than a preference level for at least one of the routers associated with the scoped interfaces.

12. The non-transitory machine-readable medium as in claim 11 wherein the preference levels are internet protocol version 6 (IPV6) preference levels.

13. The non-transitory machine-readable medium as in claim 11 comprising additional program code to cause the machine to perform the operations of:
   associating one or more host addresses with a first scoped interface in a routing table, the method further comprising using the first scoped interface to open a communication channel with a first host identified by one of the one or more host addresses in response to a request to communicate with the first host.

14. The non-transitory machine-readable medium as in claim 11 wherein the communication interfaces include a WiFi interface, an Ethernet interface, and a cellular data interface.

15. The machine-readable medium as in claim 11 wherein specifying a primary router and specifying a default router further comprises:
   arranging router identifiers for all of the routers for which a preference level has been received in a list, the router identifiers arranged in order of preference level;
   reading through the list to identify a router having the highest preference level and reachable through the primary interface to be the primary router; and
   reading through the list of identify a router having the highest preference level and reachable through each of the scoped interfaces to be the default router for each respective scoped interface.

16. The non-transitory machine-readable medium as in claim 15 wherein the preference levels comprise "high," "medium," and "low."

17. The non-transitory machine-readable medium as in claim 15 comprising additional program code to cause the machine to perform the operations of:
   receiving a new router advertisement (RA) packet transmitted from a first router on either the primary interface or one of the scoped interfaces, the RA packet having an indication of a preference level associated with the first router;
   determining if an entry for the first router already exists in the list and, if not, then entering an identifier for the first router in the list at a position based on a preference level associated with the first router; and
   reading through the list to identify a router having the highest preference level and reachable through the primary interface to be the primary router; and
   reading through the list of identify a router having the highest preference level and reachable through each of the scoped interfaces to be the default router for each respective scoped interface.

18. The non-transitory machine-readable medium as in claim 17 wherein if an entry for the first router already exists in the list, then the machine performs the additional operations of:
   determining if a preference level associated with the first router has changed and, if so, then removing the existing entry from the list and entering an identifier for the first router in the list at a position based on the new preference level associated with the first router.

19. The non-transitory machine-readable medium as in claim 18 wherein if the preference level associated with the first router has not changed, then the machine performs the additional operations of:
   determining if the first router is associated with a scoped interface or the primary interface and, if associated with the primary interface then removing the existing entry from the list and entering an identifier for the first router in the list at a position based on the new preference level associated with the first router.

20. The machine-readable medium as in claim 15 wherein the list comprises a linked list.

21. An apparatus having a memory for storing program code and a processor for processing the program code to perform the operations of:
   receiving a plurality of router advertisement packets indicating a preference level of each of a plurality of routers, each of the plurality of routers reachable through one of the communication interfaces on the computing device;
   designating one of the communication interfaces as a primary interface and the remainder of the communication interfaces as scoped interfaces, wherein each scoped interface is used for routing communications that comprise a reference to the scoped interface, and the primary interface is an unscoped interface that is used for routing communications that do not comprise a reference to an interface;
   arranging router identifiers for all of the routers for which a preference level has been received in a list, the list comprising a linked list data structure having an entry for each router with a preference level, wherein the entries are linked in the preference level order;
   specifying a primary router for the primary interface based on a preference level associated with the primary router, the primary router selected from a group of routers reachable through the primary interface; and
   specifying a default router for each of the scoped interfaces based on a preference level of each default router, each default router selected from a group of routers reachable through the corresponding scoped interface;
   wherein the primary router selected for the primary interface has a preference level which is relatively lower than a preference level for at least one of the routers associated with the scoped interfaces.

22. The apparatus as in claim 21 wherein the preference levels are internet protocol version 6 (IPV6) preference levels.

23. The apparatus as in claim 21 comprising additional program code to cause the machine to perform the operations of:
   associating one or more host addresses with a first scoped interface in a routing table, the method further comprising using the first scoped interface to open a communication channel with a first host identified by one of the one or more host addresses in response to a request to communicate with the first host.

24. The apparatus as in claim 21 wherein the communication interfaces include a WiFi interface, an Ethernet interface, and a cellular data interface.

25. The apparatus as in claim 21 wherein specifying a primary router and specifying a default router further comprises:
   arranging router identifiers for all of the routers for which a preference level has been received in a list, the router identifiers arranged in order of preference level;
   reading through the list to identify a router having the highest preference level and reachable through the primary interface to be the primary router; and
   reading through the list of identify a router having the highest preference level and reachable through each of the scoped interfaces to be the default router for each respective scoped interface.

26. The apparatus as in claim 25 wherein the preference levels comprise "high," "medium," and "low."

27. The apparatus as in claim 25 comprising additional program code to cause the processor to perform the operations of:
- receiving a new router advertisement (RA) packet transmitted from a first router on either the primary interface or one of the scoped interfaces, the RA packet having an indication of a preference level associated with the first router;
- determining if an entry for the first router already exists in the list and, if not, then entering an identifier for the first router in the list at a position based on a preference level associated with the first router; and
- reading through the list to identify a router having the highest preference level and reachable through the primary interface to be the primary router; and
- reading through the list of identify a router having the highest preference level and reachable through each of the scoped interfaces to be the default router for each respective scoped interface.

28. The apparatus as in claim 27 wherein if an entry for the first router already exists in the list, then the machine performs the additional operations of:
- determining if a preference level associated with the first router has changed and, if so, then removing the existing entry from the list and entering an identifier for the first router in the list at a position based on the new preference level associated with the first router.

29. The apparatus as in claim 28 wherein if the preference level associated with the first router has not changed, then the machine performs the additional operations of:
- determining if the first router is associated with a scoped interface or the primary interface and, if associated with the primary interface then removing the existing entry from the list and entering an identifier for the first router in the list at a position based on the new preference level associated with the first router.

30. The apparatus as in claim 25 wherein the list comprises a linked list.

* * * * *